United States Patent Office 3,491,106
Patented Jan. 20, 1970

3,491,106
SODIUM 3-(2-BENZOTHIAZOLYL) - 4-HYDROXY-
BENZENESULFONATES AND ANALOGUES
THEREOF
Harlan B. Freyermuth, Easton, Pa., assignor to GAF
Corporation, New York, N.Y., a corporation of
Delaware
No Drawing. Filed Dec. 15, 1967, Ser. No. 690,791
Int. Cl. C07d 91/44
U.S. Cl. 260—304    4 Claims

ABSTRACT OF THE DISCLOSURE

Novel sulfonated heterocyclic derivatives selected from the formulae:

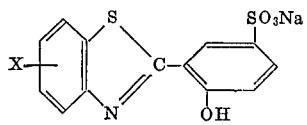

and

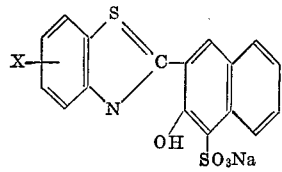

wherein X is selected from H, lower alkyl, lower alkoxy, and halogen. These water-soluble compounds are useful as highly fluorescent dyes.

---

The present invention relates to certain novel sulfonated hererocyclic derivatives, and more particularly, to certain novel, water-soluble, sulfonated benzothiazolyl derivatives having the unusual property of high fluorescence.

It is a principal object of the present invention to provide novel water-soluble, sulfonated benzothiazolyl derivatives.

It is a further object of the present invention to provide such novel water-soluble, sulfonated benzothiazolyl derivatives, which derivatives are characterized by high fluorescence.

Further objects and advantages of the novel water-soluble sulfonated benzothiazolyl derivatives of the present invention will become more apparent from the following more detailed description thereof.

The novel water-soluble sulfonated benzothiazolyl derivatives of the present invention correspond to the following formulae:

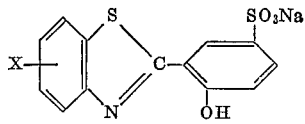

and

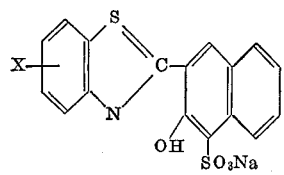

wherein X is selected from the group consisting of H, lower alkyl, e.g. methyl, ethyl, n-propyl, isopropyl, n-butyl, t-butyl, n-amyl, etc.; lower alkoxy, e.g., methoxy ethoxy, n-propoxy, isopropoxy, n-butoxy, t-butoxy, etc.; and halogen, e.g., chlorine, bromine, iodine, etc. The preferred compounds of the present invention are those in which X is hydrogen, and particularly preferred is sodium 3-(2-benzothiazolyl)-4-hydroxybenzenesulfonate.

The unsulfonated precursor of the novel compounds of the present invention are known in the prior art and can be prepared by any conventional prior art method. Thus, the intermediate 2-benzothiazolyl phenol and analogous compounds may be prepared by that method outlined in the Journal of Organic Chemistry, volume 18, pages 422–425 (1953) wherein it is indicated that the condensation product can be prepared by a condensation of 2-aminobenzenethiol and salicylic acid. Such method involves a phosphazo reaction employing phosphorus trichloride in a condensation of 2-aminobenzenethiol and analogous materials with salicylic or 2-hydroxy naphtholic acid.

Exemplary compounds falling within the above structural formulae include, for example:

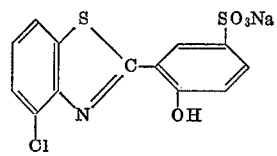

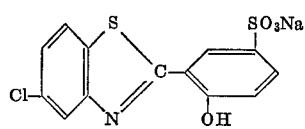

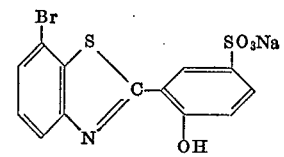

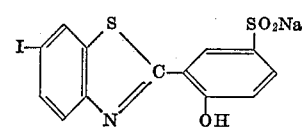

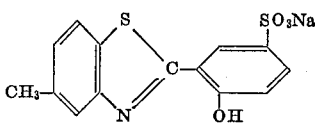

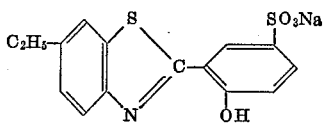

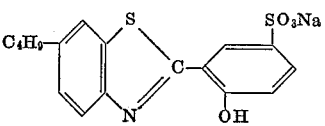

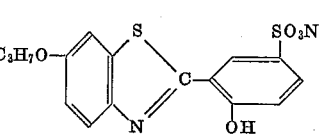

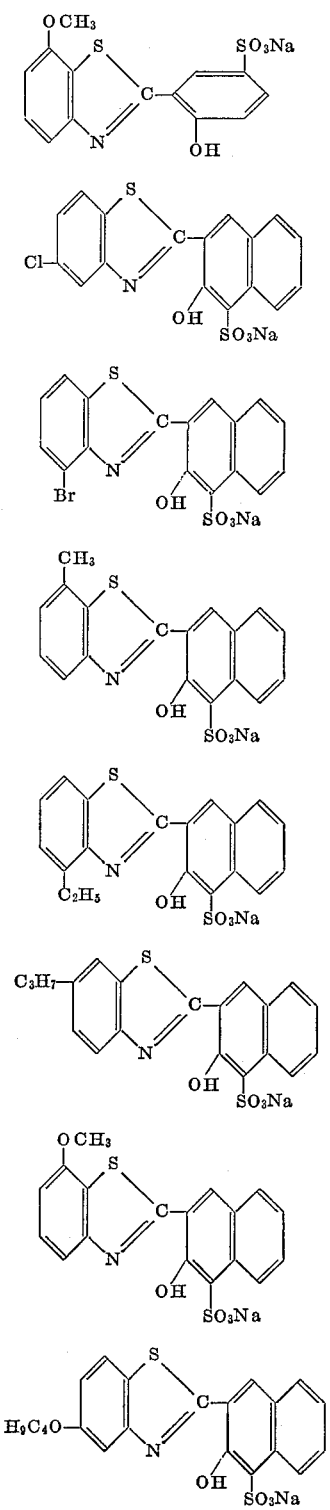

The 2-benzothiazolyphenol is generally carried out at ambient temperatures with fuming sulfuric acid. However, the temperature of sulfonation may be considerably below room temperature i.e., from 5–15° C., or can conveniently be an elevated temperature, i.e., 30–60° C. Accordingly, this sulfonation can be carried out at any temperature of from about 5° to about 60° C The concentration of the fuming sulfuric acid may vary from about 5% to about 65% dissolved $SO_3$. Since 20% fuming sulfuric acid is a commercially available and convenient concentration of oleum, it is preferred to employ such material in the production of the novel water soluble compounds of the present invention.

Generally, the 2-benzothiazolylphenol or analogous intermediate compound is dissolved in the fuming sulfuric acid slightly below room temperature, e.g., 10–20° C., and after the material is completely dissolved, the sulfonation mixture is allowed to warm to room temperature. Upon completion of the sulfonation, the mixture is drowned onto ice and the sulfonated material isolated and converted to the sodium salt in any conventional method.

As noted above, the novel compounds of the present invention are water soluble. Accordingly, such highly fluorescent materials can be easily applied from an aqueous solution. The novel compounds of the present invention having unusual fluorescent properties are particularly useful as fluorescent marking agents. Thus, for example, a primary use of such fluorescent materials is in the marking of documents etc., wherein the markings that are applied to the document etc. are invisible under ordinary visible light, but become visible when the document is subjected to fluorescent light. Accordingly, by employing the novel compounds of the present invention as fluorescent marking agents, such compounds can be employed as a ready means of identification in establishing the authenticity of various documents such as checks, etc. Again, in view of the water solubility of the novel compounds of the present invention, such compounds can be readily applied to paper, textile, organic plastics, etc. from an aqueous solution.

The hue of fluorescence of the novel water soluble benzothiazolyl derivatives of the present invention may vary from bluish-green to yellow, depending on the particular structure of the compounds. Generally, however, the hue of the fluorescent components of the present invention is a bluish-green.

The following specific examples illustrate various embodiments of the present invention. It is to be understood, however, that such examples are presented for purposes of illustration only, and the present invention is in no way to be deemed as limited thereby.

EXAMPLE 1

Some 22.7 g. (0.1 mole) 2-benzothiazolylphenol was slowly added to 160 g. (88 ml.) 20% fuming sulfuric acid at 10–15° C. during the course of an hour with continual stirring in a 250 ml. beaker. The temperature was maintained at 10–15° C. during the addition by an ice bath. After the 2-benzothiazolylphenol was all added, the ice bath was removed and the sulfonation mixture was allowed to warm up to room temperature and stirring was continued at this temperature overnight. During this period the material was completely dissolved and sulfonated. The sulfonation mixture was drowned onto about 500 g. ice and water and 160 g. common salt (NaCl) was gradually added to completely precipitate the sulfonated product. This was filtered on a Buchner funnel and wet cake was slurried in 500 ml. water. The sulfonic acid derivative and the residual sulfuric acid in the wet cake were neutralized by gradually adding 45 ml. 50% weight/volume sodium hydroxide solution to pH 6.5 at 25–30° C. The sodium 3-(2-benzothiazolyl)-4-hydroxybenzenesulfonate was filtered off and dried in a vacuum oven at 40° C. The weight of the highly fluorescent water soluble material was 29.7 g.

When applied to filter paper from an aqueous solution containing 2% of the water soluble product of the present invention, the filter paper under excitation of ultra-violet light showed a bright bluish-green fluorescence.

EXAMPLE 2

Some 13.9 g. (0.05 mole) of 3-benzothiazolyl-2-naphthol was added slowly to 95 g. (48 ml.) 20% fuming sulfuric acid in a 150 ml. beaker equipped with a stirrer, thermometer and water bath. The sulfonation mixture was allowed to stir at room temperature overnight, during which time the material was completely dissolved and sulfonated. The sulfonation mixture was drowned into a mixture of 250 g. ice and water whereupon the sulfonated product precipitated. This was filtered and washed with saturated salt solution. The wet cake was restirred in 150 ml. water and the residual acid and sulfonic acid derivative was neutralized with 28 ml. 50% wt./vol. sodium hydroxide solution. The precipitation was completed by salting out with 30 g. sodium chloride. The sulfonated derivative was filtered and dried in a vacuum oven at 60° C. The dried product, weighing 27.5 g. was found to have the following chemical composition:

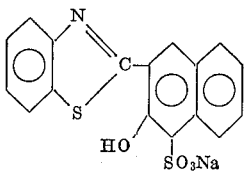

Under excitation of ultraviolet light a 1% aqueous solution of the product had a pink-white fluorescence on filter paper. Spotting with a 5% solution of sodium bicarbonate or sodium carbonate produced a bright yellow fluoresence.

EXAMPLE 3

By the method described in Example 1, the following highly fluorescent sulfonated water soluble benzothiazolyl derivatives were prepared by the sulfonation of the corresponding intermediate compounds:

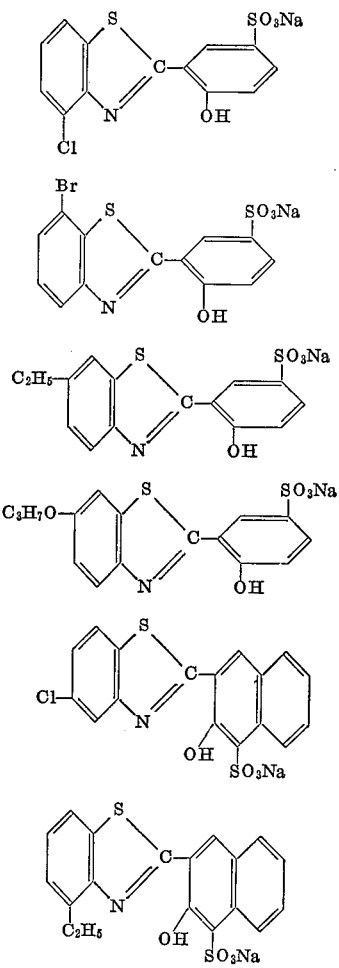

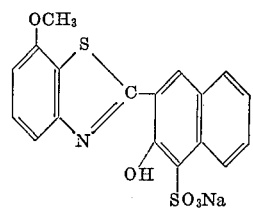

In all cases, when the above water soluble compounds were applied to paper or textiles from aqueous solutions containing from about 0.5% to about 5% of the water soluble product, under excitation from ultra-violet light a fluorescent hue ranging from bluish-green to yellow was obtained.

While various embodiments of the present invention have been described with reference to the foregoing specific examples, it is to be understood that the present invention is in no way to be deemed as limited thereby but should be construed as broadly as all or any equivalents thereof.

I claim:

1. A water-soluble compound selected from the formulae:

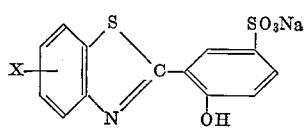

and

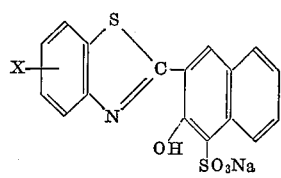

wherein X is selected from H, lower alkyl, lower alkoxy, and halogen.

2. The water soluble compound of claim 1 wherein X is hydrogen.

3. The compound:

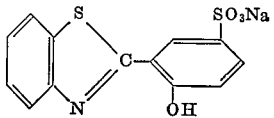

4. The compound:

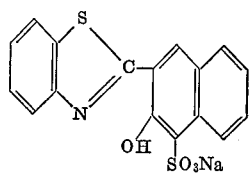

References Cited

UNITED STATES PATENTS 3,164,603  1/1965  McCafferty _____ 260—304
3,300,507  1/1967  Sharpe et al. _____ 260—304

ALEX MAZEL, Primary Examiner
R. J. GALLAGHER, Assistant Examiner

U.S. Cl. X.R.
8—7; 252—301.2